United States Patent
Kim et al.

(10) Patent No.: US 10,928,660 B2
(45) Date of Patent: Feb. 23, 2021

(54) VIEWING ANGLE CONTROLLING FILM, BACKLIGHT UNIT USING THE SAME AND DISPLAY DEVICE USING THE SAME

(71) Applicant: LG Display Co., Ltd., Seoul (KR)

(72) Inventors: JinRyun Kim, Seoul (KR); Youngki Song, Paju-si (KR); MinSoo Park, Anyang-si (KR); Eunhee Choi, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 25 days.

(21) Appl. No.: 15/988,106

(22) Filed: May 24, 2018

(65) Prior Publication Data

US 2018/0341130 A1 Nov. 29, 2018

(30) Foreign Application Priority Data

May 26, 2017 (KR) .......................... 10-2017-0065226

(51) Int. Cl.
| | | |
|---|---|---|
| *G02F 1/13* | (2006.01) | |
| *G02F 1/35* | (2006.01) | |
| *G02B 26/02* | (2006.01) | |
| *G02B 5/23* | (2006.01) | |
| *G02F 1/13357* | (2006.01) | |

(52) U.S. Cl.
CPC ........... *G02F 1/1323* (2013.01); *G02B 26/02* (2013.01); *G02F 2001/133626* (2013.01); *G02F 2202/14* (2013.01)

(58) Field of Classification Search
None
See application file for complete search history.

(56) References Cited

U.S. PATENT DOCUMENTS

| | | | |
|---|---|---|---|
| 6,398,370 B1 | 6/2002 | Chiu et al. | |
| 2005/0174529 A1* | 8/2005 | Fukushima | ........... G02F 1/1323 349/197 |
| 2006/0103779 A1 | 5/2006 | Amemiya et al. | |
| 2007/0285775 A1* | 12/2007 | Lesage | ................ G02F 1/1335 359/465 |

(Continued)

FOREIGN PATENT DOCUMENTS

| | | |
|---|---|---|
| CN | 1474950 A | 2/2004 |
| CN | 103605237 A | 2/2014 |

(Continued)

OTHER PUBLICATIONS

Office Action dated Dec. 1, 2020, issued in corresponding Chinese Patent Application No. 201810511887.9.

*Primary Examiner* — Edward J Glick
*Assistant Examiner* — Anthony G Quash
(74) *Attorney, Agent, or Firm* — Morgan, Lewis & Bockius LLP

(57) ABSTRACT

A viewing angle controlling film, a backlight unit using the same, and a display device using the same are disclosed. The viewing angle controlling film comprises a first area where light transmittance is not converted; and a second area where light transmittance is converted, wherein the second area includes a light-transmittance conversion portion configured to react with light of a predetermined wavelength range to convert the light transmittance and not to react with light of a wavelength range other than the predetermined wavelength range.

6 Claims, 10 Drawing Sheets

(56) References Cited

U.S. PATENT DOCUMENTS

| | | | |
|---|---|---|---|
| 2009/0067156 A1* | 3/2009 | Bonnett | G02F 1/133621 |
| | | | 362/97.2 |
| 2010/0271721 A1 | 10/2010 | Gaides et al. | |
| 2016/0011441 A1 | 1/2016 | Schwartz et al. | |
| 2017/0010516 A1 | 1/2017 | Shiota | |
| 2018/0039009 A1* | 2/2018 | Chong | G02B 6/0065 |
| 2018/0059308 A1* | 3/2018 | Li | G02B 6/0055 |
| 2018/0259799 A1* | 9/2018 | Kroon | G02B 30/27 |
| 2019/0146137 A1* | 5/2019 | Wang | G02B 6/0001 |
| | | | 362/613 |

FOREIGN PATENT DOCUMENTS

| | | | | |
|---|---|---|---|---|
| CN | 106019688 A | | 10/2016 | |
| CN | 106462025 A | | 2/2017 | |
| JP | 2002-100231 A | | 4/2002 | |
| JP | 2006-171700 A | | 6/2006 | |
| JP | 2012-230219 A | | 11/2012 | |
| JP | 2012230219 A | * | 11/2012 | ............... B32B 7/02 |
| KR | 10-0609370 B1 | | 8/2006 | |
| KR | 10-1546554 B1 | | 8/2015 | |
| KR | 10-2015-0127211 A | | 11/2015 | |
| WO | 2017/050631 A1 | | 3/2017 | |

* cited by examiner

VIEWING ANGLE CONTROLLING FILM, BACKLIGHT UNIT USING THE SAME AND DISPLAY DEVICE USING THE SAME

CROSS REFERENCE TO RELATED APPLICATIONS

This application claims the benefit of the Korean Patent Application No. 10-2017-0065226 filed on May 26, 2017, which is hereby incorporated by reference for all purposes as if fully set forth herein.

BACKGROUND

Technical Field

The present disclosure relates to a display device, and more particularly, to a display device comprising a viewing angle controlling film.

Discussion of the Related Art

A display device comprising a viewing angle controlling device to protect privacy of a user has been devised. That is, a display device which allows only a user to view an image without allowing people near the user to fail to view the image by reducing a viewing angle using the viewing angle controlling device has been devised.

Hereinafter, a display device comprising a viewing angle controlling device according to the related art will be described with reference to the accompanying drawing.

FIG. 1 is a brief view illustrating a display device comprising a viewing angle controlling device according to the related art.

As shown in FIG. 1, the display device of the related art comprises a display panel 10 and a viewing angle controlling film 20.

The viewing angle controlling film 20 is arranged above the display panel 10 and controls a viewing angle of an image emitted from the display panel 10. In more detail, since the viewing angle controlling film 20 is provided with a plurality of barriers 25 made of a light-shielding material therein, the viewing angle for the image emitted from the display panel 10 is reduced. Therefore, the user can view the image only at a front side of the display panel 10, and has a difficulty in viewing the image at a peripheral side of the display panel 10.

However, if the viewing angle controlling film 20 of the related art is used, the viewing angle of the display device is fixed without being changed, whereby a problem occurs in that the user should always view an image at a narrow viewing angle. To solve this problem, the viewing angle controlling film 20 may detachably be fixed to the display panel 10. In this case, there is inconvenience that the user should arrange the viewing angle controlling film 20 in person.

SUMMARY

Accordingly, the present disclosure is directed to a viewing angle controlling film, a backlight unit using the same and a display device using the same that substantially obviates one or more problems due to limitations and disadvantages of the related art.

An object of the present invention is to provide a viewing angle controlling film and a backlight unit using the same and a display device using the same, in which a viewing angle may easily be changed while the viewing angle controlling film is not detachable to a display panel.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings To achieve these and other aspects of the inventive concepts, as embodied and broadly described, a viewing angle controlling film comprises a first area where light transmittance is not converted; and a second area where light transmittance is converted, wherein the second area includes a light-transmittance conversion portion configured to react with light of a predetermined wavelength range to convert the light transmittance and not to react with light of a wavelength range other than the predetermined wavelength range.

In another aspect, a backlight unit comprises a first light source for emitting first light of a first wavelength range; a second light source for emitting second light of a second wavelength range different from the first wavelength range; and a viewing angle controlling film, wherein the viewing angle controlling film comprises; a first area where light transmittance is not converted; and a second area where light transmittance is converted, wherein the second area includes a light-transmittance conversion portion configured to react with the second light to convert the light transmittance and not to react with the first light.

In still another aspect, a display device comprises a first light source for emitting first light of a first wavelength range; a second light source for emitting second light of a second wavelength range different from the first wavelength range; a viewing angle controlling film; and a display panel for displaying an image by being supplied with the first light, wherein the viewing angle controlling film comprises; a first area where light transmittance is not converted; and a second area where light transmittance is converted, wherein the second area includes a light-transmittance conversion portion configured to react with the second light to convert the light transmittance and not to react with the first light.

In further still another aspect, a display device comprises a display panel for displaying an image; a light source for emitting light of a predetermined wavelength range; and a viewing angle controlling film, wherein the viewing angle controlling film comprises; a first area where light transmittance is not converted; and a second area where light transmittance is converted, wherein the second area includes a light-transmittance conversion portion configured to react with light of the predetermined wavelength range to convert the light transmittance and not to react with light emitted from the display panel.

The first area may be provided to have a first light transmissivity, and the second area may be provided to have variable light transmissivity.

The first area may adjoin the second area laterally.

A third area where light transmittance is not converted may be further provided. The third area may include an opaque area having a light-shielding portion, adjoins the second area while overlapping the second area vertically, and adjoins the first area laterally.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
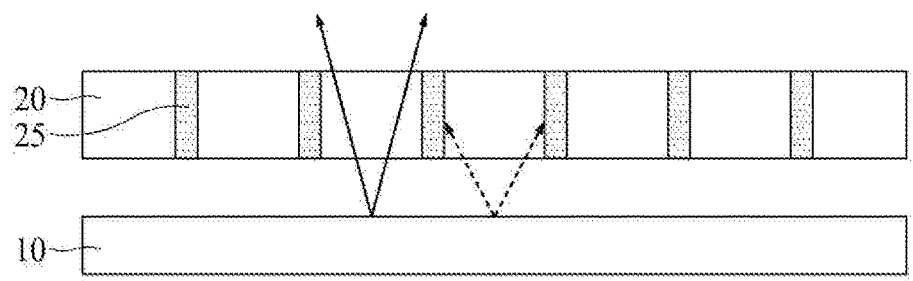
FIG. 1 is a brief view illustrating a display device comprising a viewing angle controlling device according to the related art.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~', and 'next to~', one or more portions may be arranged between two other portions unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another element. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, various embodiments of the present invention will be described in detail with reference to the accompanying drawings.

Figure 2A:
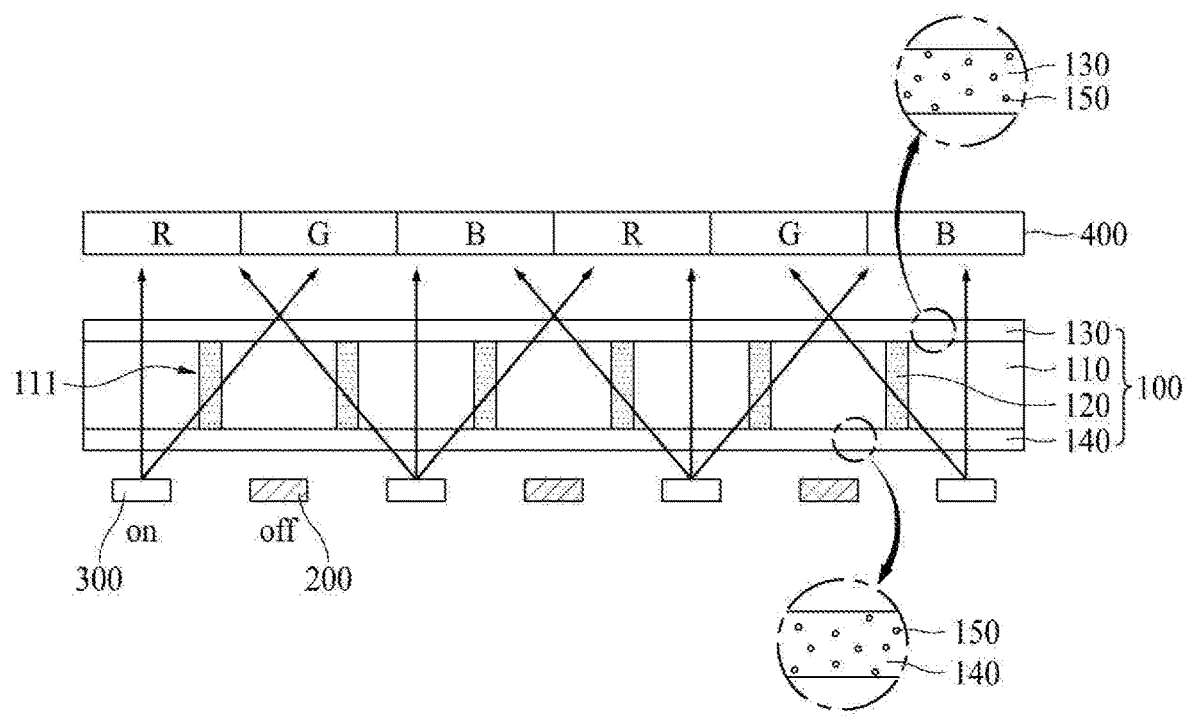
FIGS. 2A and 2B are brief views illustrating a display device comprising a viewing angle controlling device according to one embodiment of the present invention, wherein FIG. 2A corresponds to a wide viewing angle mode, and FIG. 2B corresponds to a narrow viewing angle mode.
Figure 2B:
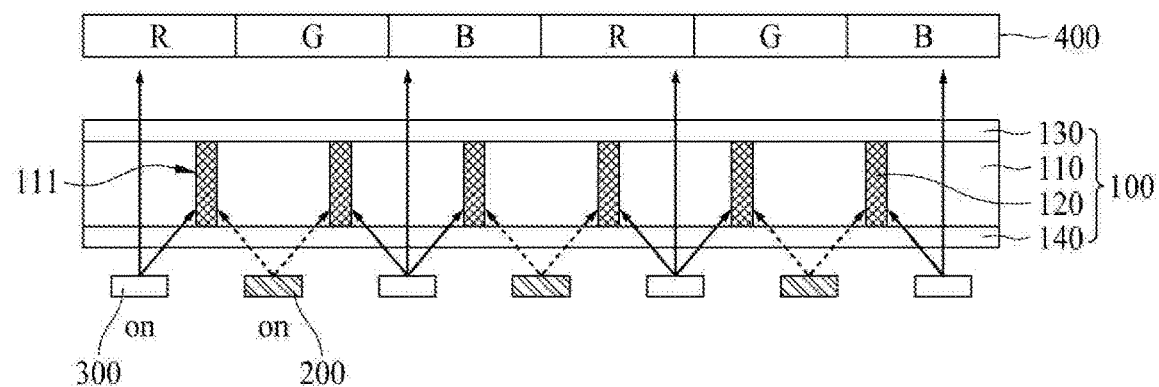

FIGS. 2A and 2B are brief views illustrating a display device comprising a viewing angle controlling device according to one embodiment of the present invention, wherein FIG. 2A corresponds to a wide viewing angle mode, and FIG. 2B corresponds to a narrow viewing angle mode.

As shown in FIGS. 2A and 2B, the display device according to one embodiment of the present invention comprises viewing angle controlling devices 100 and 200, a backlight unit light source 300, and a display panel 400.

The viewing angle controlling devices 100 and 200 include a viewing angle controlling film 100 and a viewing angle controlling light source 200. The viewing angle controlling film 100 may include an area where light transmittance is changed by being reversibly reacted with light emitted from the viewing angle controlling light source 200 and an area that is always transparent regardless of light emitted from the viewing angle controlling light source 200, thereby controlling a viewing angle of the display device.

The viewing angle controlling film 100 includes a base 110, a light-transmittance conversion portion 120, and protective portions 130 and 140.

The base 110 is made of a transparent material. A plurality of grooves 111 are provided in the base 110. The plurality of grooves 111 may be formed to pass through an upper surface to a lower surface of the base 110 as shown. However, the plurality of grooves 111 are not limited to the shown example.

The light-transmittance conversion portion 120 is formed in the plurality of grooves 111 of the base 110. The light-transmittance conversion portion 120 is provided with a plurality of partition walls spaced apart from one another at a predetermined interval. The viewing angle of the display device can be controlled by light-transmittance change of the light-transmittance conversion portion 120. The light-transmittance conversion portion 120 may be filled in, but not limited to, entirety of the plurality of grooves 111.

The light-transmittance conversion portion 120 includes a material of which light transmittance is reversibly changed due to reaction with light emitted from the viewing angle controlling light source 200. That is, light transmittance of the light-transmittance conversion portion 120 in the case that light is not emitted from the viewing angle controlling light source 200 is different from light transmittance of the light-transmittance conversion portion 120 in the case that light is emitted from the viewing angle controlling light source 200. For example, the light-transmittance conversion portion 120 is a transparent state in the case that light is not emitted from the viewing angle controlling light source 200, and if light is emitted from the viewing angle controlling light source 200, the light-transmittance conversion portion 120 may be switched to an opaque state by being reacted with the emitted light. This light-transmittance conversion portion 120 may include a material, such as a photochromic material, of which light transmittance is changed due to reversible reaction with light of a specific wavelength. Hereinafter, in this specification, the material of which light transmittance is changed by reversible reaction with light of the specific wavelength will be referred to as a photo-reactive transmittance conversion material.

The photo-reactive transmittance conversion material may be included in the light-transmittance conversion portion 120 in the range of 1 weight % to 20 weight %. If the photo-reactive transmittance conversion material is included in the light-transmittance conversion portion 120 in the range less than 1 weight %, a light-transmittance variation of the light-transmittance conversion portion 120 is not great even though light is emitted from the viewing angle controlling light source 200, whereby a viewing angle controlling function may be deteriorated. According to an experiment, if a photochromic material is included in the light-transmittance conversion portion 120 in the range less than 1 weight %, a light-shielding ratio of the light-transmittance conversion portion 120 is reduced to a value less than 70%, whereby it is noted that the viewing angle controlling function is deteriorated. Also, if the photo-reactive transmittance conversion material exceeds 20 weight % of the light-transmittance conversion portion 120, a light-shielding ratio of the light-transmittance conversion portion 120 is not increased greatly and only a process of forming the light-transmittance conversion portion 120 may be difficult. According to the experiment, if the photochromic material is included in the light-transmittance conversion portion 120 in the range of 20 weight %, the light-shielding ratio of the light-transmittance conversion portion 120 is 90% or more, whereby it is noted that the viewing angle controlling function is sufficient. Meanwhile, the light-transmittance conversion portion 120 is formed by including a process of dissolving the photo-reactive transmittance conversion material in a polymer resin. At this time, if the photo-reactive transmittance conversion material exceeds 20 weight % of the light-transmittance conversion portion 120, the process of dissolving the photo-reactive transmittance conversion material in the polymer resin may be difficult.

The protective portions 130 and 140 include an upper protective portion 130 and a lower protective portion 140. The upper protective portion 130 is formed on upper surfaces of the base 110 and the light-transmittance conversion portion 120 to protect the upper surfaces of the base 110 and the light-transmittance conversion portion 120. The lower protective portion 140 is formed on lower surfaces of the base 110 and the light-transmittance conversion portion 120 to protect the lower surfaces of the base 110 and the light-transmittance conversion portion 120. The light-transmittance conversion portion 120 is sealed by the protective portions 130 and 140 to be prevented from leaking out. The protective portions 130 and 140 are made of a transparent material.

The viewing angle controlling light source 200 supplies light to the viewing angle controlling film 100 and changes light transmittance of the light-transmittance conversion portion 120. The viewing angle controlling light source 200 may be made of, but not limited to, a point light source such as LED. The viewing angle controlling light source 200 emits light of a wavelength different from that of the backlight light source 300. As an example, the backlight light source 300 may emit light of a visible ray wavelength while the viewing angle controlling light source 200 may emit light of a short wavelength of 400 nm or less. In this case, the light-transmittance conversion portion 120 may include a photo-reactive transmittance conversion material reversibly reacted with light of a short wavelength of 400 nm or less.

The backlight light source 300 serves to supply light to the display panel 400. The backlight light source 300 may be made of, but not limited to, a point light source such as LED. As described above, the backlight light source 300 emits light of a wavelength different from that of the viewing angle controlling light source 200. Particularly, the light emitted from the backlight light source 300 does not change light transmittance of the light-transmittance conversion portion 120. As an example, the light-transmittance conversion portion 120 is reversibly reacted with light of a short wavelength of 400 nm or less emitted from the viewing angle controlling light source 200, whereby its light transmittance is changed. However, the light-transmittance conversion portion 120 is not reacted with light of a visible ray wavelength emitted from the backlight light source 300, whereby its light transmittance is not changed.

The backlight light source 300 and the viewing angle controlling light source 200 may be arranged below the viewing angle controlling film 100. Various modifications may be made to a detailed arrangement of the backlight light source 300 and the viewing angle controlling light source 200, and will be described later.

The display panel 400 may be arranged above the viewing angle controlling film 100. The display panel 400 may be made of a liquid crystal display panel which is a non-light emission panel, and thus may display an image through light emitted from the backlight light source 300. However, the display panel 400 according to the present invention is not limited to the liquid crystal panel. For example, the display panel 400 may be made of a self-light emission panel like an organic light emitting panel. In this case, the backlight light source 300 is not required. The display panel 400 includes pixels of red (R), green (G) and blue (B).

A viewing angle controlling method of the display device according to one embodiment of the present invention is as follows.

As shown in FIG. 2A, if the viewing angle controlling light source 200 is maintained at an off-state, the light-transmittance conversion portion 120 becomes a transparent state, whereby the viewing angle controlling film 100 becomes transparent. Therefore, the light emitted from the backlight light source 300 moves toward various directions by transmitting the base 110 and the light-transmittance conversion portion 120, whereby a wide viewing angle mode is realized.

As shown in FIG. 2B, if the viewing angle controlling light source 200 is maintained at an on-state, the light-transmittance conversion portion 120 becomes an opaque state, whereby the viewing angle controlling film 100 includes a transparent area (an area of the base 110) and an opaque area (an area of the light-transmittance conversion portion 120). Therefore, the light emitted from the backlight light source 300 moves to the transparent area only, whereby a narrow viewing angle mode is realized.

Although not shown, the light-transmittance conversion portion 120 may be provided in such a manner that the light-transmittance conversion portion 120 becomes an opaque state to realize the narrow viewing angle mode when the viewing angle controlling light source 200 is maintained at an off-state, and the light-transmittance conversion portion 120 becomes a transparent state to realize the wide viewing angle mode when the viewing angle controlling light source 200 is maintained at an on-state.

Meanwhile, in the narrow viewing angle mode, when the light emitted from the backlight light source 300, moving toward the transparent area passes through the display panel 400 where the pixels of red (R), green (G) and blue (B) are arranged regularly, a moire phenomenon occurs due to a relation between movement of the light and arrangement of the pixels, whereby image quality may be deteriorated. Therefore, to prevent the moire phenomenon from occurring, as shown in portions drawn out of arrows of FIG. 2a, a plurality of beads 150 may be included in the protective portions 130 and 140. In this way, if the beads 150 are provided in the protective portions 130 and 140, the light emitted from the backlight light source 300, moving toward the transparent area only is diffracted or diffused while colliding with the beads 150, whereby the moire phenomenon may be reduced. The beads 150 may be included in both the upper protective portion 130 and the lower protective portion 140 but may be included in any one of the upper protective portion 130 and the lower protective portion 140.

Figure 3A:
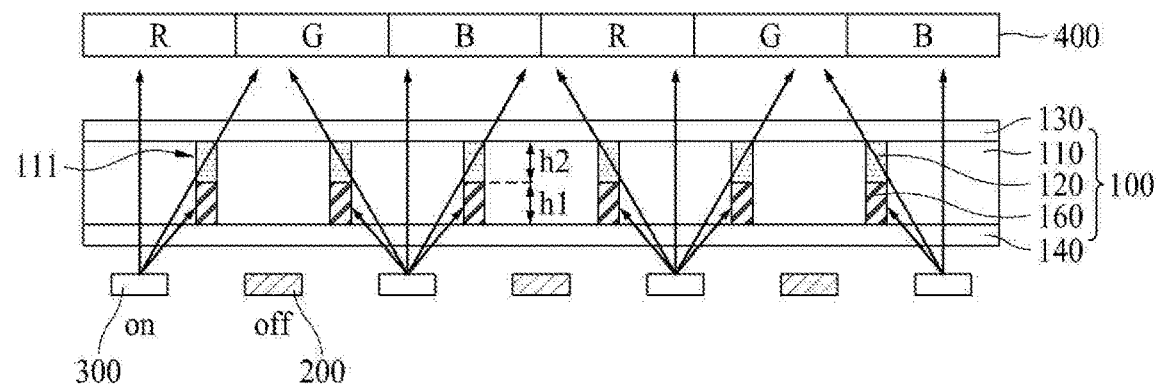
FIGS. 3A and 3B are brief views illustrating a display device comprising a viewing angle controlling device according to another embodiment of the present invention, wherein FIG. 3A corresponds to a wide viewing angle mode, and FIG. 3B corresponds to a narrow viewing angle mode.
Figure 3B:
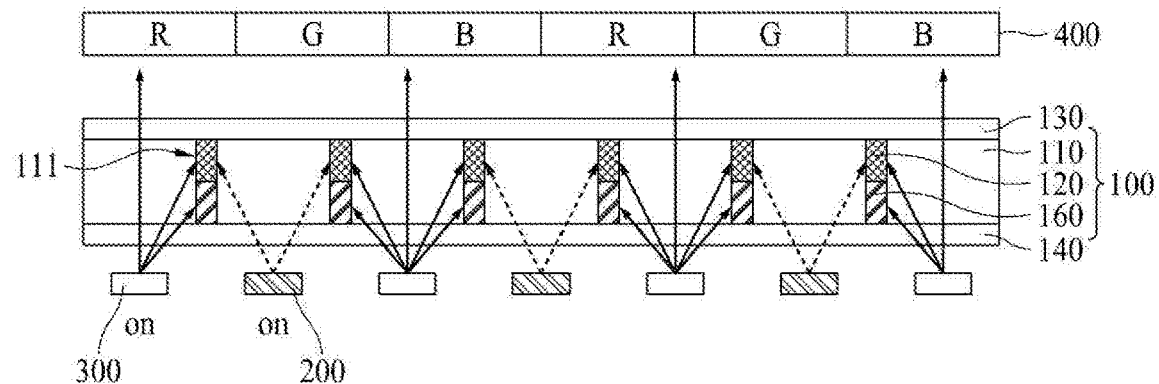

FIGS. 3A and 3B are brief views illustrating a display device comprising a viewing angle controlling device according to another embodiment of the present invention, wherein FIG. 3a corresponds to a wide viewing angle mode, and FIG. 3b corresponds to a narrow viewing angle mode.

The display device of FIGS. 3A and 3B are the same as that of FIGS. 2A and 2B except that the viewing angle controlling film 100 is changed. Therefore, the same reference numerals are given to the same elements, and only elements different from those of FIGS. 2a and 2b will be described hereinafter.

According to another embodiment of the present invention, the viewing angle controlling film 100 may include an area of which light transmittance is changed by reversible reaction with light emitted from the viewing angle controlling light source 200, an area always transparent regardless of the light emitted from the viewing angle controlling light source 200, and an area always opaque regardless of the light emitted from the viewing angle controlling light source 200, whereby the viewing angle of the display device may be controlled.

The viewing angle controlling film 100 according to another embodiment of the present invention includes a base 110, a light-transmittance conversion portion 120, a light-shielding portion 160, and protective portions 130 and 140.

The base 110 is made of a transparent material in the same manner as the aforementioned embodiment, and includes a plurality of grooves 111.

The light-transmittance conversion portion 120 is formed in the plurality of grooves 111 of the base 110. Particularly, the light-transmittance conversion portion 120 is formed in a part of each of the plurality of grooves 111, and the light-shielding portion 160 is formed in the other part of each of the plurality of grooves 111. That is, the light-transmittance conversion portion 120 and the light-shielding portion 160 are formed in the plurality of grooves 111 while overlapping and adjoining each other. Since detailed elements of the light-transmittance conversion portion 120 are the same as the aforementioned elements, their repeated description will be omitted.

The light-shielding portion 160 is formed in the plurality of grooves 111 of the base 110 while overlapping the light-transmittance conversion portion 120 as described above. The light-shielding portion 160 includes a light-shielding material, such as carbon black, known in the art. As shown, the light-shielding portion 160 may be arranged below, but not limited to, the light-transmittance conversion portion 120. The light-shielding portion 160 may be arranged above the light-transmittance conversion portion 120.

As described above, according to another embodiment of the present invention, the viewing angle controlling film 100 includes the light-shielding portion 160, whereby the narrow viewing angle mode may be more smoothly realized. This will be described in more detail. The light-transmittance conversion portion 120 may be converted to an opaque state by the light emitted from the viewing angle controlling light source 200. At this time, a light-shielding ratio of the light-transmittance conversion portion 120 may be changed depending on a content of the photo-reactive transmittance conversion material, whereby it might be possible that light may transmit the light-transmittance conversion portion 120 to some extent. Therefore, if the narrow viewing angle mode is realized through the light-transmittance conversion portion 120 only, the light may partially be transmitted, whereby it may be difficult to fully realize the narrow viewing angle mode. In another embodiment of the present invention, since the light-shielding portion 160 is additionally included, the light-shielding ratio of the light-shielding portion 160 may be increased, whereby the narrow viewing angle mode may be realized more smoothly.

A ratio (h1:h2) of a height h1 of the light-shielding portion 160 to a height h2 of the light-transmittance conversion portion 120 may be in the range of 5:95 to 50:50. If the height h1 of the light-shielding portion 160 is lower than the above range, it is not likely to obtain a smooth realization effect of the narrow viewing angle mode, and if the height h1 of the light-shielding portion 160 is higher than the above range, it may be difficult to realize the wide viewing angle mode.

The protective portions 130 and 140 include the upper protective portion 130 and the lower protective portion 140. The light-transmittance conversion portion 120 and the light-shielding portion 160 are sealed by the protective portions 130 and 140 to be prevented from leaking out. The detailed configuration of the protective portions 130 and 140 is the same as the aforementioned embodiment.

A viewing angle controlling method of the display device according to another embodiment of the present invention is as follows.

As shown in FIG. 3A, if the viewing angle controlling light source 200 is maintained at an off-state, the light-transmittance conversion portion 120 becomes a transparent state. Therefore, the viewing angle controlling film 100 except the light-shielding portion 160 becomes transparent, whereby the light emitted from the backlight light source 300 moves toward various directions by transmitting the base 110 and the light-transmittance conversion portion 120, whereby a wide viewing angle mode is realized.

As shown in FIG. 3B, if the viewing angle controlling light source 200 is maintained at an on-state, the light-transmittance conversion portion 120 becomes an opaque state, whereby the viewing angle controlling film 100 includes a transparent area (an area of the base 110) and an opaque area (an area of the light-transmittance conversion portion 120 and the light-shielding portion 160). Therefore, the light emitted from the backlight light source 300 moves to the transparent area only, whereby a narrow viewing angle mode is realized.

Figure 4A:
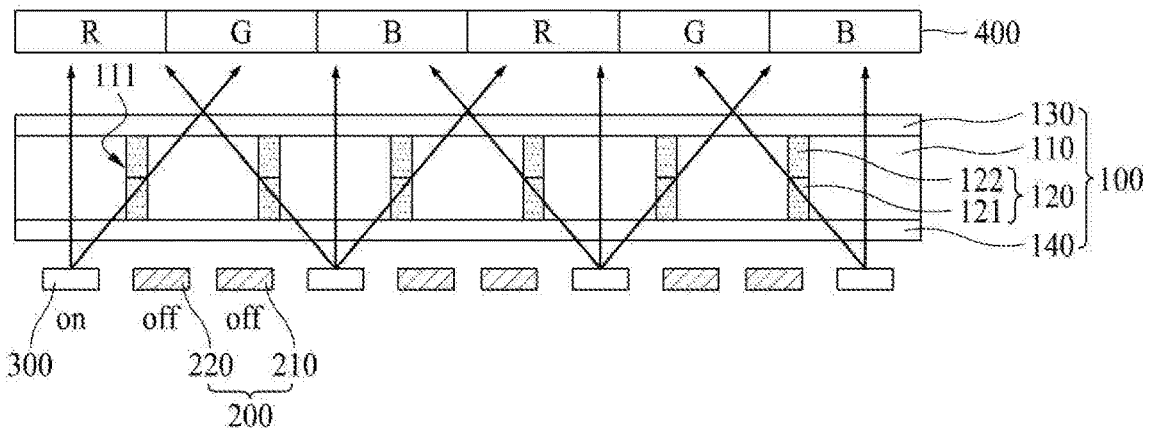
FIGS. 4A to 4C are brief views illustrating a display device comprising a viewing angle controlling device according to still another embodiment of the present invention, wherein FIG. 4A corresponds to a wide viewing angle mode, FIG. 4B corresponds to a middle viewing angle mode, and FIG. 4C corresponds to a narrow viewing angle mode.
Figure 4B:
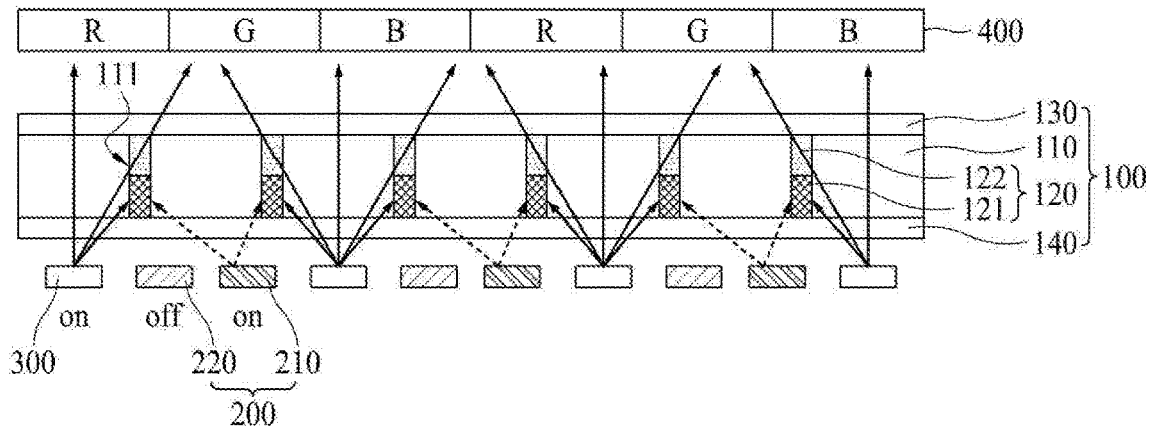
Figure 4C:
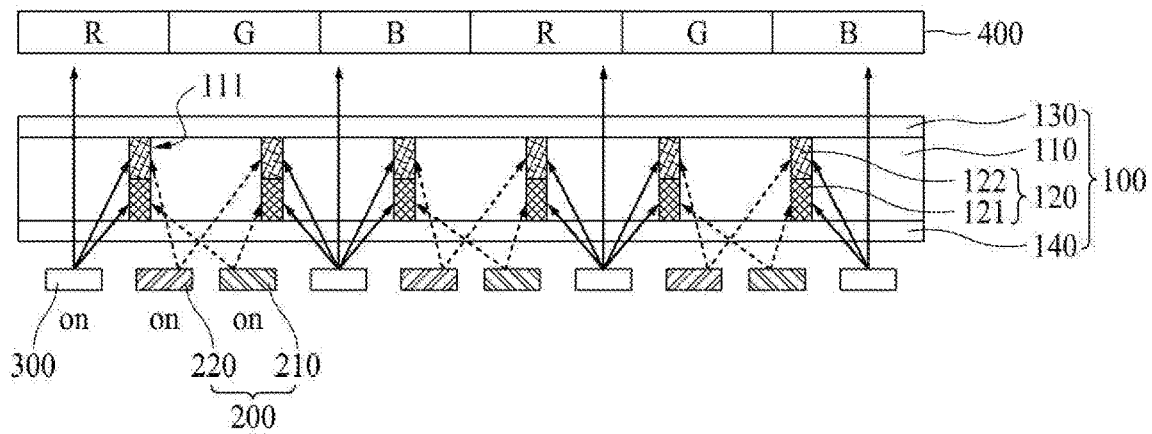

FIGS. 4A to 4C are brief views illustrating a display device comprising a viewing angle controlling device according to still another embodiment of the present invention, wherein FIG. 4A corresponds to a wide viewing angle mode, FIG. 4B corresponds to a middle viewing angle mode, and FIG. 4C corresponds to a narrow viewing angle mode.

The display device of FIGS. 4A to 4C are the same as that of FIGS. 2A and 2B except that the light-transmittance conversion portion 120 and the viewing angle controlling light source 200 are changed. Therefore, the same reference numerals are given to the same elements, and only elements different from those of FIGS. 2A and 2B will be described hereinafter.

According to still another embodiment of the present invention, the light-transmittance conversion portion 120 in the viewing angle controlling film 100 includes a first light-transmittance conversion portion 121 and a second light-transmittance conversion portion 122. The first light-transmittance conversion portion 121 and the second light-transmittance conversion portion 122 are formed in the plurality of grooves 111 of the base 110 while overlapping and adjoining each other. That is, the first light-transmittance conversion portion 121 is formed in a part of each of the plurality of grooves 111, and the second light-transmittance conversion portion 122 is formed in the other part of each of the plurality of grooves 111. The first light-transmittance conversion portion 121 may be arranged below or above the second light-transmittance conversion portion 122.

The viewing angle controlling light source 200 includes a first viewing angle controlling light source 210 and a second viewing angle controlling light source 220. The first viewing angle controlling light source 210 emits light of a wavelength different from that of each of the second viewing angle controlling light source 220 and the backlight light source 300. Also, the second viewing angle controlling light source 220 emits light of a wavelength different from that of each of the first viewing angle controlling light source 210 and the backlight light source 300. As an example, the backlight light source 300 may emit light of a visible ray wavelength while the first viewing angle controlling light source 210 and the second viewing angle controlling light source 220 may emit their respective light of a short wavelength of 400 nm or less.

The first light-transmittance conversion portion 121 includes a material of which light transmittance is reversibly changed by being reacted with light emitted from the first viewing angle controlling light source 210. Also, the first light-transmittance conversion portion 121 is made of a material of which light transmittance is maintained without being reacted with the light emitted from the second viewing angle controlling light source 220 and the backlight light source 300. Therefore, light transmittance of the first light-transmittance conversion portion 121 in the case that the light is not emitted from the first viewing angle controlling light source 210 is different from light transmittance of the first light-transmittance conversion portion 121 in the case that the light is emitted from the first viewing angle controlling light source 210. For example, the first light-transmittance conversion portion 121 is a transparent state in the case that light is not emitted from the first viewing angle controlling light source 210, and if the light is emitted from the first viewing angle controlling light source 210, the first light-transmittance conversion portion 121 may be switched to an opaque state by being reacted with the emitted light.

The second light-transmittance conversion portion 122 includes a material of which light transmittance is reversibly changed by being reacted with the light emitted from the second viewing angle controlling light source 220. Also, the second light-transmittance conversion portion 122 is made of a material of which light transmittance is maintained without being reacted with the light emitted from the first viewing angle controlling light source 210 and the backlight light source 300. Therefore, light transmittance of the second light-transmittance conversion portion 122 in the case that the light is not emitted from the second viewing angle controlling light source 212 is different from light transmittance of the second light-transmittance conversion portion 122 in the case that the light is emitted from the second viewing angle controlling light source 220. For example, the second light-transmittance conversion portion 122 is a transparent state in the case that light is not emitted from the second viewing angle controlling light source 220, and if the light is emitted from the second viewing angle controlling light source 220, the second light-transmittance conversion portion 122 may be switched to an opaque state by being reacted with the emitted light.

According to still another embodiment of the present invention, as described above, the viewing angle may be modified to more various angles. A viewing angle controlling method of the display device according to still another embodiment of the present invention is as follows.

As shown in FIG. 4A, if the first viewing angle controlling light source 210 and the second viewing angle controlling light source 220 are maintained at off-states, the first light-transmittance conversion portion 121 and the second light-transmittance conversion portion 122 become transparent states. Therefore, the viewing angle controlling film 100 fully becomes transparent, whereby the light emitted from the backlight light source 300 moves toward various directions by transmitting the base 110, the first light-transmittance conversion portion 121 and the second light-transmittance conversion portion 122, whereby a wide viewing angle mode is realized.

As shown in FIG. 4B, if the first viewing angle controlling light source 210 is maintained at an on-state and the second viewing angle controlling light source 220 is maintained at an off-state, the first light-transmittance conversion portion 121 becomes an opaque state and the second light-transmittance conversion portion 122 becomes a transparent state. Therefore, the viewing angle controlling film 100 includes a transparent area (areas of the base 110 and the second light-transmittance conversion portion 122) and an opaque area (an area of the first light-transmittance conversion portion 121). Therefore, the light emitted from the backlight light source 300 moves to the transparent area, whereby a middle viewing angle mode is realized. At this time, if a height of the first light-transmittance conversion portion 121 is controlled properly, an angle of the middle viewing angle may be controlled properly.

As shown in FIG. 4C, if the first viewing angle controlling light source 210 is maintained at an on-state and the second viewing angle controlling light source 220 is maintained at an on-state, the first light-transmittance conversion portion 121 and the second light-transmittance conversion portion 122 become opaque states. Therefore, the viewing angle controlling film 100 includes a transparent area (an area of the base 110) and an opaque area (areas of the first light-transmittance conversion portion 121 and the second light-transmittance conversion portion 122). Therefore, the light emitted from the backlight light source 300 moves to the transparent area, whereby a narrow viewing angle mode is realized.

Figure 5A:
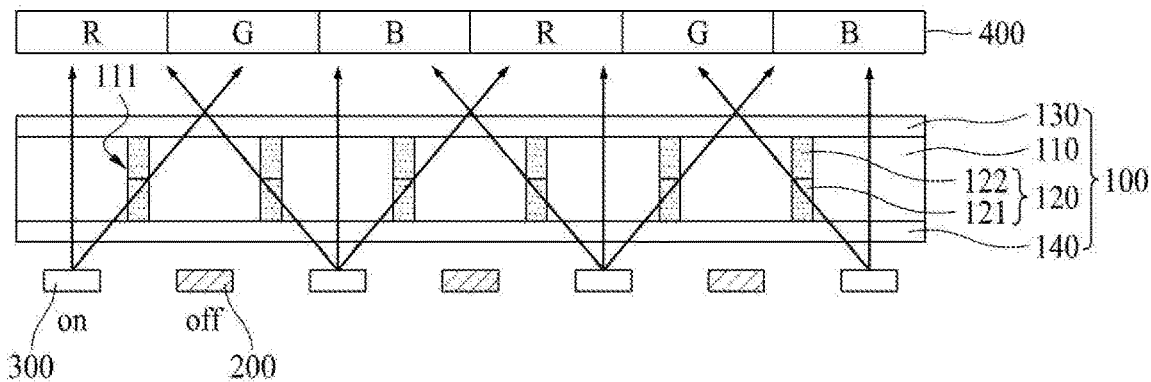
FIGS. 5A and 5B are brief views illustrating a display device comprising a viewing angle controlling device according to another embodiment of the present invention.
Figure 5B:
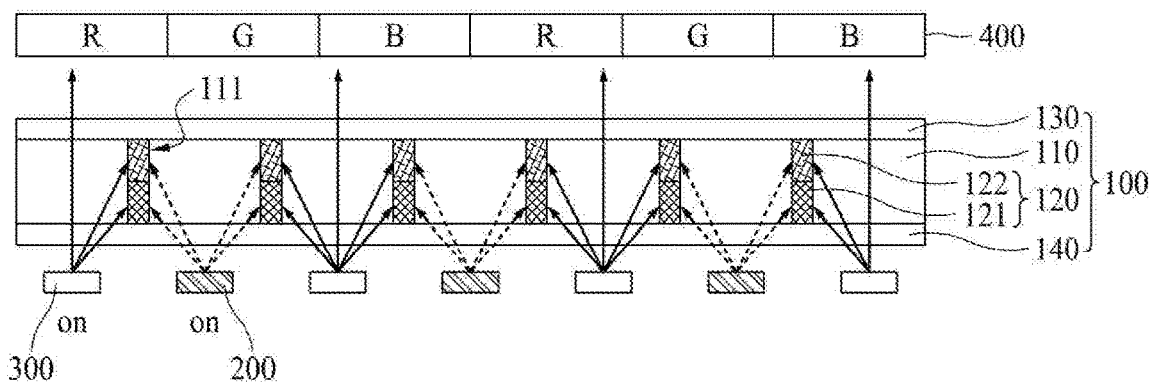

FIGS. 5A and 5B are brief views illustrating a display device comprising a viewing angle controlling device according to further still another embodiment of the present invention, wherein FIG. 5A corresponds to a wide viewing angle mode, and FIG. 5B corresponds to a narrow viewing angle mode.

The display device of FIGS. 5A and 5B are the same as that of FIGS. 2A and 2B except that the light-transmittance conversion portion 120 is changed. Therefore, the same reference numerals are given to the same elements, and only elements different from those of FIGS. 2A and 2B will be described hereinafter.

According to further still another embodiment of the present invention, the light-transmittance conversion portion 120 in the viewing angle controlling film 100 includes a first light-transmittance conversion portion 121 and a second light-transmittance conversion portion 122. The first light-transmittance conversion portion 121 and the second light-transmittance conversion portion 122 are formed in the plurality of grooves 111 of the base 110 while overlapping and adjoining each other. That is, the first light-transmittance conversion portion 121 is formed in a part of each of the plurality of grooves 111, and the second light-transmittance conversion portion 122 is formed in the other part of each of the plurality of grooves 111. The first light-transmittance conversion portion 121 may be arranged below or above the second light-transmittance conversion portion 122.

The first light-transmittance conversion portion 121 and the second light-transmittance conversion portion 122 include a material of which light transmittance is reversibly changed by being reacted with light emitted from the viewing angle controlling light source 200. At this time, a content of a photo-reactive transmittance conversion material contained in the first light-transmittance conversion portion 121 is different from that of a photo-reactive transmittance conversion material contained in the second light-transmittance conversion portion 122. As an example, the content of the photo-reactive transmittance conversion material contained in the first light-transmittance conversion portion 121 is more than that of the photo-reactive transmittance conversion material contained in the second light-transmittance conversion portion 122. In this case, the first light-transmittance conversion portion 121 is reacted with the light emitted from the viewing angle controlling light source 200 to have a relatively high light-shielding ratio, and the second light-transmittance conversion portion 122 is reacted with the light emitted from the viewing angle controlling light source 200 to have a relatively low light-shielding ratio.

A viewing angle controlling method of the display device according to further still another embodiment of the present invention is as follows.

As shown in FIG. 5A, if the viewing angle controlling light source 200 is maintained at an off-state, the first light-transmittance conversion portion 121 and the second light-transmittance conversion portion 122 become transparent states. Therefore, the viewing angle controlling film 100 fully becomes transparent, whereby the light emitted from the backlight light source 300 moves toward various directions by transmitting the base 110, the first light-transmittance conversion portion 121 and the second light-transmittance conversion portion 122, whereby a wide viewing angle mode is realized.

As shown in FIG. 5B, if the viewing angle controlling light source 210 is maintained at an on-state, the first light-transmittance conversion portion 121 and the second light-transmittance conversion portion 122 become opaque states. Therefore, the viewing angle controlling film 100 includes a transparent area (an area of the base 110) and an opaque area (areas of the first light-transmittance conversion portion 121 and the second light-transmittance conversion portion 122). Therefore, the light emitted from the backlight light source 300 moves to the transparent area, whereby a narrow viewing angle mode is realized.

Meanwhile, if the viewing angle controlling light source 200 is maintained at an on-state, the first light-transmittance conversion portion 121 may become an opaque state and the second light-transmittance conversion portion 122 may become a semi-transparent state. In this case, the viewing angle controlling film 100 includes a transparent area (an area of the base 110), an opaque area (an area of the first light-transmittance conversion portion 121), and a semi-transparent area (an area of the second light-transmittance conversion portion 122). Therefore, the light emitted from the backlight light source 300 moves to the transparent area and partially moves to the semi-transparent area, whereby a middle viewing angle mode may be realized.

Figure 6:
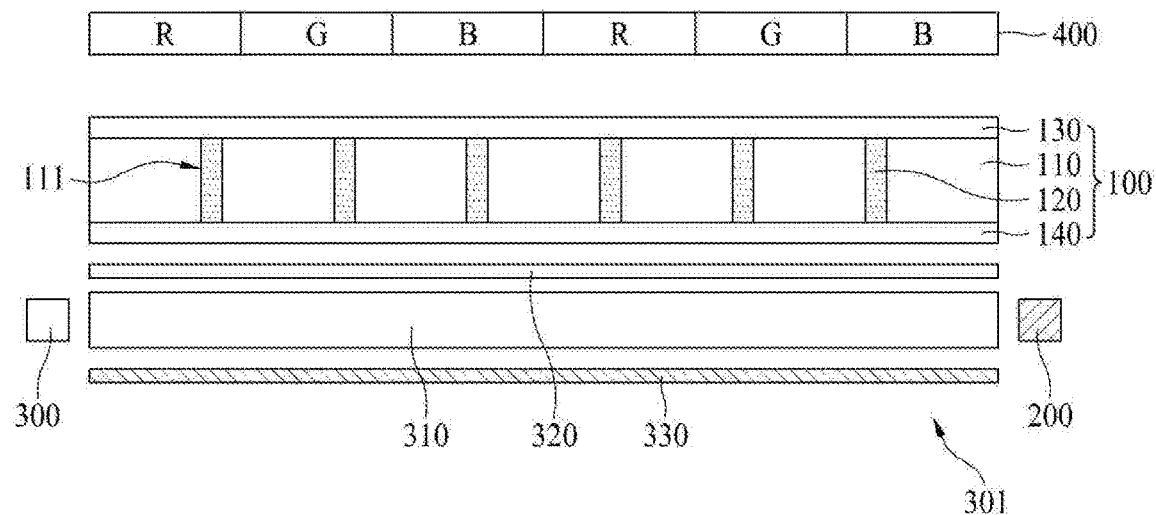
FIG. 6 is a brief view illustrating a display device comprising a viewing angle controlling device according to still another embodiment of the present invention.

FIG. 6 is a brief view illustrating a display device comprising a viewing angle controlling device according to still another embodiment of the present invention, wherein the display device relates to a liquid crystal display device.

As shown in FIG. 6, the display device according to still another embodiment of the present invention comprises viewing angle controlling devices 100 and 200, a backlight unit 301, and a display panel 400.

The viewing angle controlling devices 100 and 200 include a viewing angle controlling film 100 and a viewing angle controlling light source 200. Various modifications may be made to the viewing angle controlling film 100 and the viewing angle controlling light source 200 as shown in FIGS. 2A and 2B, FIGS. 3A and 3B, FIGS. 4A to 4C or FIGS. 5A and 5B, and their repeated description will be omitted.

The backlight unit 301 includes a backlight light source 300, a light guide plate 310, an optical film 320, and a reflective plate 330.

The backlight light source 300 emits light of a wavelength different from that of the viewing angle controlling light source 200 as described above. Particularly, the light emitted from the backlight light source 300 does not change light transmittance of the light-transmittance conversion portion 120 in the viewing angle controlling film 100. The backlight light source 300 faces the light guide plate 310, and the light emitted from the backlight light source 300 enters the light guide plate 310 and then its moving direction is changed in the light guide plate 310, whereby the light moves toward the optical film 320.

The light guide plate 310 changes the moving direction of the light emitted from the backlight light source 300 toward the optical film 320, and various modifications known in the art may be made to the light guide plate 310.

The optical film 320 is arranged above the light guide plate 310 and serves to uniformly emit light incident through the light guide plate 310. The optical film 320 may be made of a combination of a plurality of optical sheets such as diffusion sheet and prism sheet, and various modifications known in the art may be made to the optical film 320.

The reflective plate 330 is arranged below the light guide plate 310 and serves to reflect light, which moves to the lower portion of the light guide plate 310, toward the upper portion of the light guide plate 310. Various modifications known in the art may be made to the reflective plate 330.

The display panel 400 is made of a liquid crystal display panel that includes pixels of red (R), green (G) and blue (B).

In case of the display device according to FIG. 6, when the light emitted from the backlight unit 301 passes though the display panel 400, an image is displayed, and the wide viewing angle mode or the narrow viewing angle mode may be controlled by the viewing angle controlling devices 100 and 200.

At this time, the viewing angle controlling film 100 is arranged between the display panel 400 and the viewing angle controlling light source 200 and between the display panel 400 and the backlight light source 300. Therefore, light transmittance of the viewing angle controlling film 100 is converted by the light emitted from the viewing angle light source 200, and the light emitted from the backlight light source 300 passes through the viewing angle controlling film 100 of which light transmittance is converted, whereby the narrow viewing angle mode or the wide viewing angle mode may be realized.

Therefore, although the viewing angle controlling film 100 may be formed between the display panel 400 and the optical film 320 as shown, the viewing angle controlling film 100 may be formed between the optical film 320 and the light guide plate 310. However, since the viewing angle controlling film 100 may be arranged to adjoin the display panel 400 to realize the narrow viewing angle mode more smoothly, the viewing angle controlling film 100 may be formed between the display panel 400 and the optical film 320. That is, if the viewing angle controlling film 100 is formed between the optical film 320 and the light guide plate 310, since the light which has passed through the viewing angle controlling film 100 again passes through the optical film 320 and then enters the display panel 400, the viewing angle may be changed when the light passes through the optical film 320. In this specification, when any one element adjoins another element, this means that a third element is not interposed between these elements.

In case of the display device according to FIG. 6, the viewing angle controlling light source 200 is included in the backlight unit 301. That is, the viewing angle controlling light source 200 is included in the backlight unit 301 made of a separate assembly body. In this specification, the backlight unit 301 means an assembly body that elements such as the light guide plate 310 and the reflective plate 330 are received and coupled by a guide frame and/or a case.

In detail, the viewing angle controlling light source 200 faces the light guide plate 310, and thus the light emitted from the viewing angle controlling light source 200 enters the light guide plate 310 and then its moving direction is changed, whereby the light transmits the optical film 320 and then enters the viewing angle controlling film 100.

As described above, since the viewing angle controlling light source 200 is included in the backlight unit 301, the viewing angle controlling light source 200 may be driven using a driving circuit for driving the backlight unit 301. Therefore, the viewing angle of the display device may be controlled without a separate driving portion.

Meanwhile, the viewing angle controlling film 100 may be included in the backlight unit 301, and this is equally applied to the following various embodiments.

FIGS. 7A, 7B, 8 and 9 are views illustrating arrangement of the viewing angle controlling light source 200 and the backlight light source 300 according to various embodiments of the present invention. This arrangement may be applied to the aforementioned display device of FIG. 6.

Figure 7A:
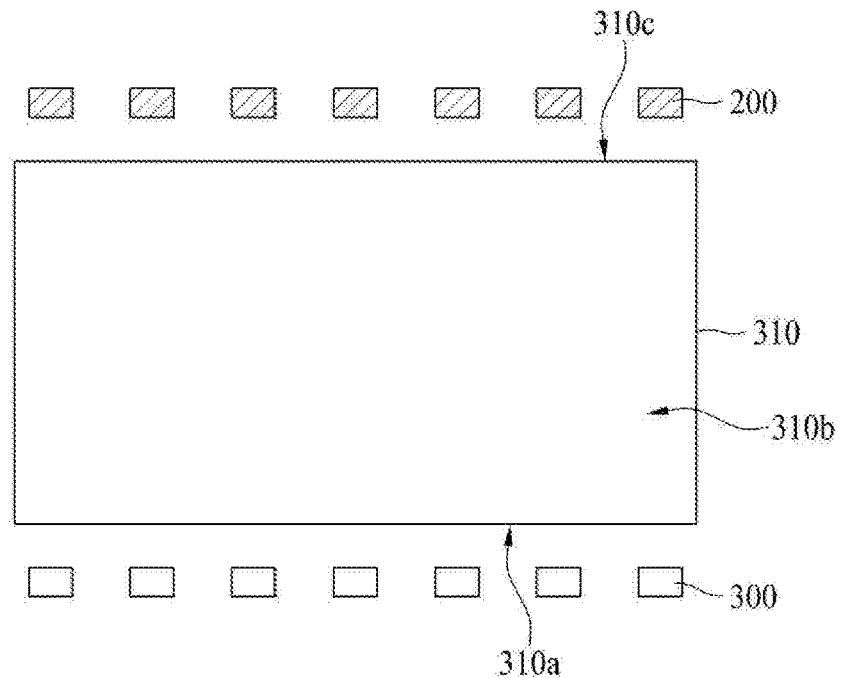
FIGS. 7A, 7B, 8 and 9 are views illustrating arrangement of a viewing angle controlling light source and a backlight light source according to various embodiments of the present invention.

As shown in FIG. 7A, the backlight light source 300 may be arranged at one side 310a of the light guide plate 310, and the viewing angle controlling light source 200 may be arranged at the other side 310c of the light guide plate 310. In this case, the light emitted from the backlight light source 300 enters one side 310a of the light guide plate 310 and then its moving direction is changed, whereby the light is emitted through an upper surface 310b of the light guide plate 310. The light emitted from the viewing angle controlling light source 200 enters the other side 310c of the light guide plate 310 and then its moving direction is changed, whereby the light is emitted through the upper surface 310b of the light guide plate 310.

Figure 7B:
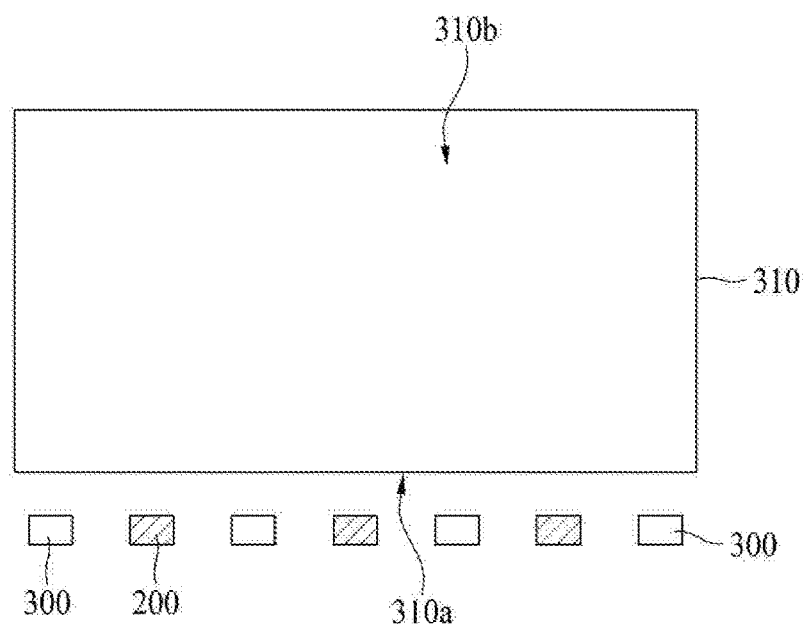

As shown in FIG. 7B, the viewing angle controlling light source 200 and the backlight light source 300 may be arranged alternately at one side 310a of the light guide plate 310. In this case, the light emitted from the viewing angle controlling light source 200 and the light emitted from the backlight light source 300 enter one side 310a of the light guide plate 310 and then their moving directions are changed, whereby the light emitted from the viewing angle controlling light source 200 and the light emitted from the backlight light source 300 are emitted through the upper surface 310b of the light guide plate 310.

Figure 8:
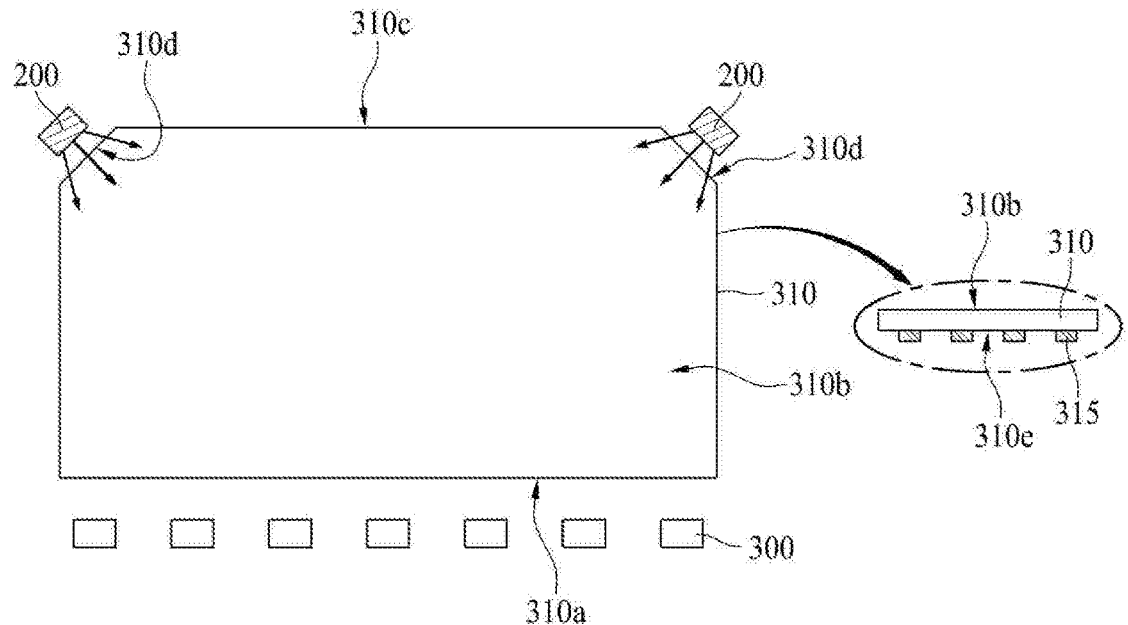

As shown in FIG. 8, the backlight light source 300 may be arranged at one side 310a of the light guide plate 310, and the viewing angle controlling light source 200 may be arranged at corner surfaces 310d of both ends of the other side 310c of the light guide plate 310. The viewing angle controlling light source 200 may be arranged only at the corner surface 310d of any one end of the other side 310c of the light guide plate 310. The corner surface 310d of the other side 310c of the light guide plate 310 may be provided in a chamfering type, and the viewing angle controlling light source 200 is arranged to face the chamfering type corner surface 310d. In this case, the light emitted from the backlight light source 300 enters one side 310a of the light guide plate 310 and then its moving direction is changed, whereby the light is emitted through the upper surface 310b of the light guide plate 310. The light emitted from the viewing angle controlling light source 200 enters the corner surface 310d of the light guide plate 310 and then its moving direction is changed, whereby the light is emitted through the upper surface 310b of the light guide plate 310.

In the embodiment of FIG. 8, since the number of the viewing angle controlling light sources 200 is smaller than that in FIGS. 7A and 7B, it may be desired to improve efficiency of light emitted through the upper surface 310b of the light guide plate 310 after being emitted from the viewing angle controlling light source 200. To this end, as shown from a portion drawn out of an arrow in FIG. 8, a photo-reflective pattern 315 may additionally be formed on a lower surface 310e of the light guide plate 310.

The photo-reflective pattern 315 may include a material for transmitting the light emitted from the backlight light source 300, for example, light of a visible ray wavelength range without reflecting the corresponding light while reflecting the light emitted from the viewing angle controlling light source 200, for example, light of a short wavelength range of 400 nm or less. Therefore, a moving path of the light emitted from the backlight light source 300 may not be changed by the photo-reflective pattern 315. The photo-reflective pattern 315 may be made of, but not limited to, a dot pattern. Also, the photo-reflective pattern 315 may be protruded on the lower surface 310e of the light guide plate 310 in a convex structure, but may be inserted into the lower surface 310e of the light guide plate 310 in a concave structure.

The photo-reflective pattern 315 may be applied to the aforementioned structure according to FIGS. 7A and 7B and a structure according to FIGS. 10 and 11, which will be described later, as well as the structure according to FIG. 8.

Figure 9:
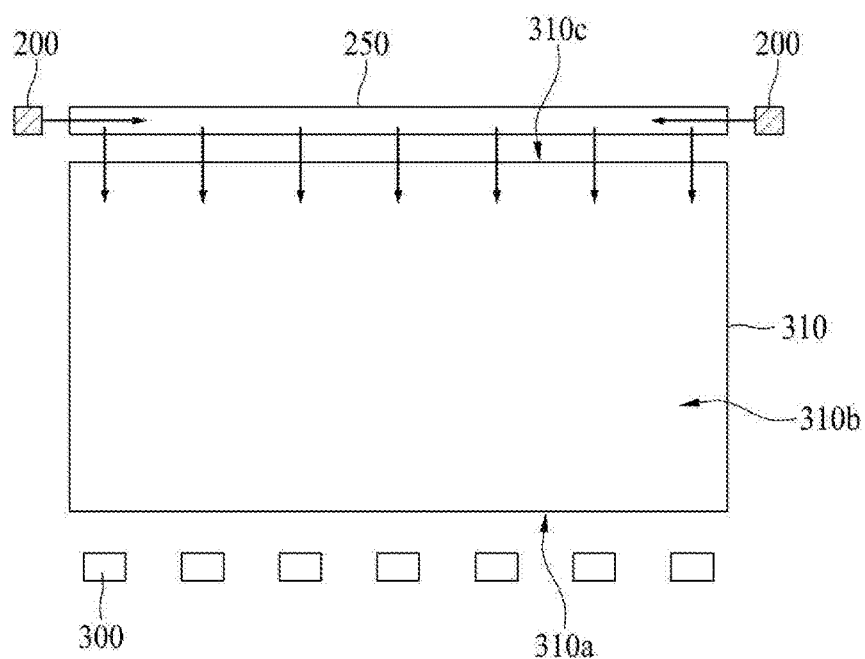

As will be aware of it from FIG. 9, the backlight light source 300 may be arranged at one side 310a of the light guide plate 310, and the viewing angle controlling light source 200 may be arranged at both ends of the other side 310c of the light guide plate 310. The viewing angle controlling light source 200 may be arranged only at any one end of the other side 310c of the light guide plate 310.

An auxiliary light guide plate 250 is additionally formed at the other side 310c of the light guide plate 310. The auxiliary light guide plate 250 is extended longitudinally along the other side 310c of the light guide plate 310. The viewing angle controlling light source 200 is arranged to face the end of the auxiliary light guide plate 250. In this case, the light emitted from the backlight light source 300 enters one side 310a of the light guide plate 310 and then its moving direction is changed, whereby the light is emitted through the upper surface 310b of the light guide plate 310. The light emitted from the viewing angle controlling light source 200 enters the auxiliary light guide plate 250 and then its moving direction is changed, whereby the light again enters the light guide plate 310. Afterwards, the moving direction of the light is changed on the light guide plate 310, whereby the light is emitted through the upper surface 310b of the light guide plate 310.

In the embodiment of FIG. 9, the light emitted from the viewing angle controlling light source 20 which is a point light source enters the auxiliary light guide plate 250 and then is emitted toward the light guide plate 310 in the form of a linear light source, whereby light efficiency may be improved. The auxiliary light guide plate 250 may include, but not limited to, an optical cable.

Figure 10:
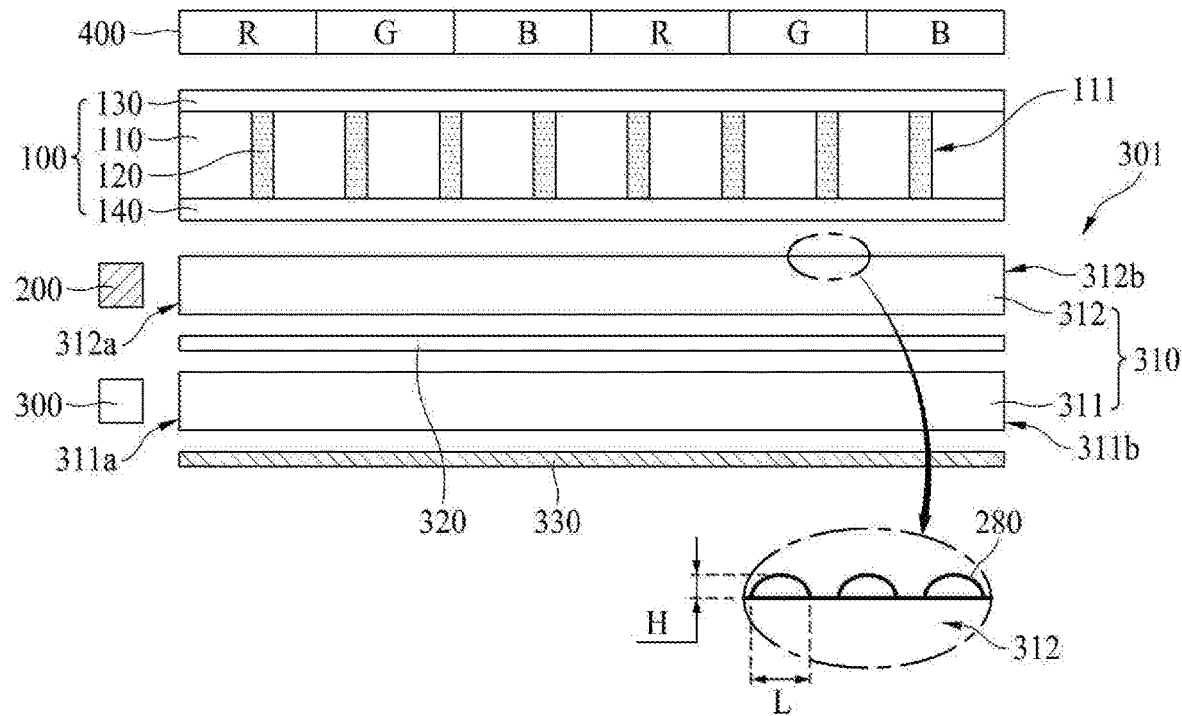
FIG. 10 is a brief view illustrating a display device comprising a viewing angle controlling device according to further still another embodiment of the present invention.

FIG. 10 is a brief view illustrating a display device comprising a viewing angle controlling device according to further still another embodiment of the present invention, wherein the display device relates to a liquid crystal display device.

The display device of FIG. 10 is the same as that of FIG. 6 except that the light-transmittance conversion portion 120 and the light guide plate 310 are changed. Therefore, the same reference numerals are given to the same elements, and only elements different from those of FIG. 6 will be described hereinafter.

As shown in FIG. 10, the light guide plate 310 includes a first light guide plate 311 and a second light guide plate 312.

The first light guide plate 311 is arranged between the optical film 320 and the reflective plate 330, and the second light guide plate 312 is arranged between the optical film 320 and the viewing angle controlling film 100. That is, the second light guide plate 312 is arranged above the first light guide plate 311 while overlapping the first light guide plate 311 by interposing the optical film 320 therebetween. Particularly, the optical film 320 is not formed above the second light guide plate 312, whereby the second light guide plate 312 is arranged to adjoin the viewing angle controlling film 100.

The first light guide plate 311 serves to change a moving direction of light emitted from the backlight light source 300 toward the optical film 320, and the second light guide plate 312 serves to change a moving direction of light emitted from the viewing angle controlling light source 200 toward the viewing angle controlling film 100. Therefore, the backlight light source 300 is arranged to face one side 311a of the first light guide plate 311, and the viewing angle controlling light source 200 is arranged to face one side 312a of the second light guide plate 312. As a result, the viewing angle controlling light source 200 is arranged above the backlight light source 300. As shown, the viewing angle controlling light source 200 and the backlight light source 300 may be arranged to overlap each other. However, without limitation to this case, the viewing angle controlling light source 200 and the backlight light source 300 may be arranged not to overlap each other. As an example, the viewing angle controlling light source 200 may be arranged to face the other side 312b of the second light guide plate 312, and the backlight light source 300 may be arranged to face one side 311a of the first light guide plate 311. Alternatively, the viewing angle controlling light source 200 may be arranged to face one side 312a of the second light guide plate 312, and the backlight light source 300 may be arranged to face the other side 311b of the first light guide plate 311. Various modifications may be made to the structure of the viewing angle controlling light source 200 and the second light guide plate 312 like the structure of the viewing angle controlling light source 200 and the light guide plate 310 except the backlight light source 300 in the aforementioned structure of FIGS. 7A, 8 and 9.

In case of the aforementioned display device according to FIG. 6, the light emitted from the viewing angle controlling light source 200 enters the viewing angle controlling film 100 by passing through the light guide plate 310 and the optical film 320. At this time, if light of a short wavelength range of 400 nm or less is emitted from the viewing angle controlling light source 200, more light of the short wavelength may be absorbed in the light guide plate 310 and the optical film 320, whereby light transmittance of the viewing angle controlling film 100 may not be converted easily.

On the contrary, in case of the display device according to FIG. 10, the light emitted from the viewing angle controlling light source 200 enters the viewing angle controlling film 100 by passing through the second light guide plate 312 only without passing through the optical film 320. Therefore, in case of the display device according to FIG. 10, the amount of light emitted from the viewing angle controlling light source 200 and then entering the viewing angle controlling film 100 may be more increased than the display device according to FIG. 6, whereby light transmittance of the viewing angle controlling film 100 may be converted relatively easily.

Meanwhile, as shown in a portion drawn out of an arrow in FIG. 10, a convex type condensing pattern 280 may additionally be formed on an upper surface of the second light guide plate 312. The condensing pattern 280 may be formed in a semi-spherical structure. If the condensing pattern 280 is additionally formed, an emission rate of light emitted from the viewing angle controlling light source 200 and then emitted through the second light guide plate 312 may be increased, whereby light transmittance of the viewing angle controlling film 100 may be converted more easily.

According to an experiment, it is noted that the amount of light emitted through the second light guide plate 312 is increased if a ratio H/L of a height H to a lower width L of the condensing pattern 280 is increased. Particularly, it is noted that the emission rate of the light emitted through the second light guide plate 312 is 50% or more if the ratio H/L is 0.5 or more. It is also noted that the emission rate of the light emitted through the second light guide plate 312 is 90% or more if the ratio H/L is 1.0. Therefore, the condensing pattern 280 may be formed such that the ratio H/L is in the range of 0.5 to 1.0. If the ratio H/L exceeds 1.0, the emission rate is not increased greatly and the process of forming the condensing pattern 280 may be difficult.

The condensing pattern 280 may be applied to the aforementioned structure of FIGS. 6 to 9 and a structure of FIG. 11, which will be described later, as well as the structure of FIG. 10.

Figure 11:
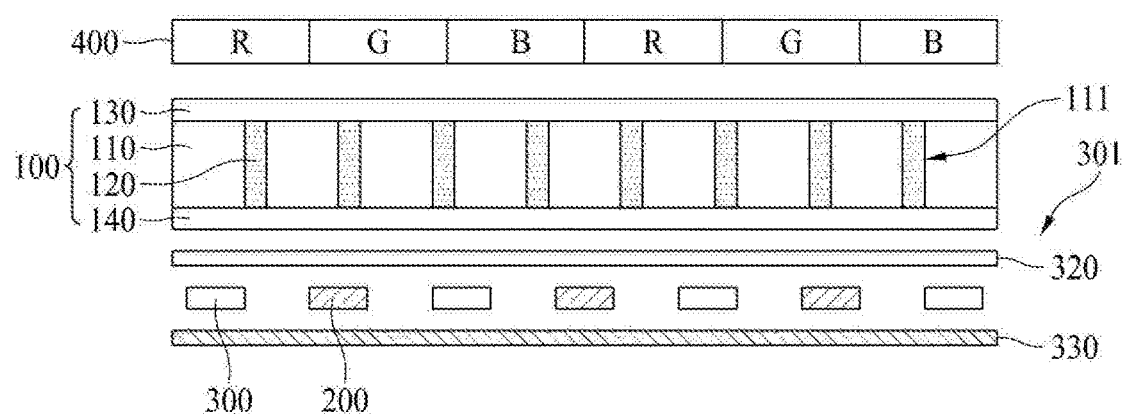
FIG. 11 is a brief view illustrating a display device comprising a viewing angle controlling device according to further still another embodiment of the present invention.

FIG. 11 is a brief view illustrating a display device comprising a viewing angle controlling device according to further still another embodiment of the present invention, wherein the display device relates to a liquid crystal display device. The display device according to FIGS. 6 to 10 relates to an edge type liquid crystal display device comprising a light guide plate 310 and light sources 200 and 300 arranged at one side of the light guide plate 310, whereas the display device of FIG. 11 relates to a direct type liquid crystal display device which does not comprise a light guide plate, and comprises light sources 200 and 300 arranged below a display panel 400.

As shown in FIG. 11, the display device according to further still another embodiment of the present invention comprises a display panel 400, a viewing angle controlling film 100 arranged below the display panel 400, and a backlight unit 301 arranged below the viewing angle controlling film 100.

The display panel 400 and the viewing angle controlling film 100 may be modified in the same manner as the aforementioned various embodiments. Therefore, their repeated description will be omitted.

The backlight unit 301 includes an optical film 320 arranged below the viewing angle controlling film 100, the viewing angle controlling light source 200 and the backlight light source 300 arranged below the optical film 320, and a reflective plate 330 arranged below the viewing angle controlling light source 200 and the backlight light source 300. The viewing angle controlling light source 200 and the backlight light source 300 may be arranged alternately and repeatedly between the optical film 320 and the reflective plate 330. Various modifications such as various direct type backlight units known in the art can be made to the detailed configuration of the backlight unit 301.

Figure 12A:
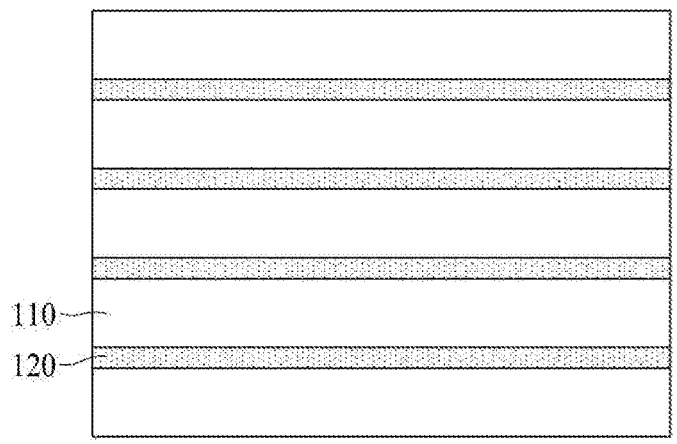
FIGS. 12A to 12C are brief process views illustrating a method for manufacturing a viewing angle controlling film according to one embodiment of the present invention.
Figure 12B:
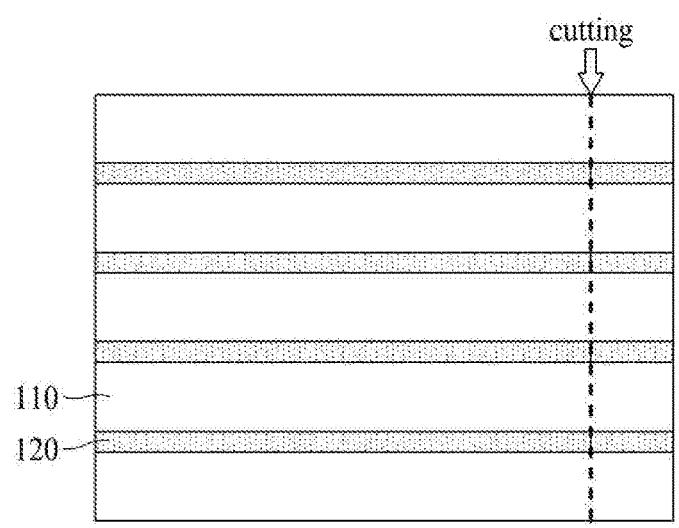
Figure 12C:
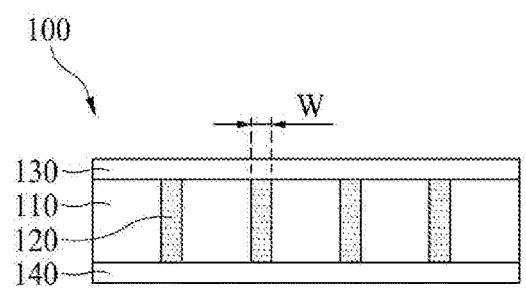

FIGS. 12A to 12C are brief process views illustrating a method for manufacturing a viewing angle controlling film 100 according to one embodiment of the present invention.

First, as shown in FIG. 12A, a base 110 and a light-transmittance conversion portion 120 are deposited alternately in a vertical direction. Afterwards, the base 110 and the light-transmittance conversion portion 120 are subjected to thermal compression to obtain a predetermined deposition structure.

Next, as shown in FIG. 12B, the deposition structure is cut in a vertical direction to obtain a structure that the base 110 and the light-transmittance conversion portion 120 are arranged alternately.

Next, as shown in FIG. 12C, the base 110 and the light-transmittance conversion portion 120 are positioned to be arranged alternately in a horizontal direction, and then an upper protective portion 130 is formed on the base 110 and the light-transmittance conversion portion 120 and a lower protective portion 140 is formed below the base 110 and the light-transmittance conversion portion 120. Although not shown in detail, the upper protective portion 130 and the lower protective portion 140 may be attached to the base 110 and the light-transmittance conversion portion 120 by a transparent adhesive.

In case of the viewing angle controlling film 100 according to one embodiment of the present invention, which is manufactured by the process according to FIGS. 12a to 12c, a width W of the light-transmittance conversion portion 120 may be formed uniformly.

Figure 13A:
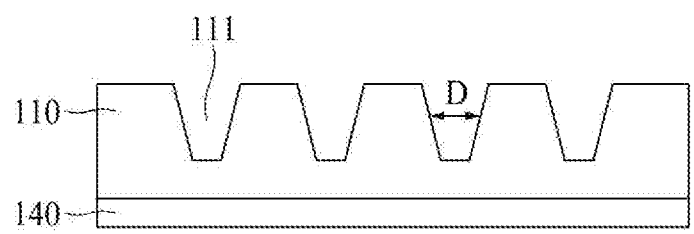
FIGS. 13A to 13C are brief process views illustrating a method for manufacturing a viewing angle controlling film according to another embodiment of the present invention.
Figure 13B:
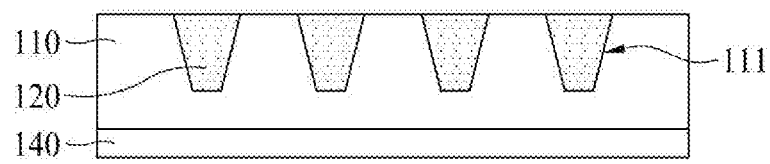
Figure 13C:
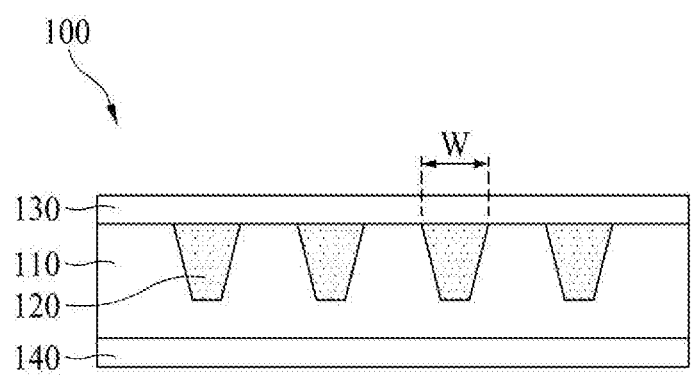

FIGS. 13A to 13C are brief process views illustrating a method for manufacturing a viewing angle controlling film according to another embodiment of the present invention.

First, as shown in FIG. 13A, the base 110 is formed on the lower protective portion 140. In detail, a material layer for the base 110 is deposited on the lower protective portion 140 and then a predetermined mold is inserted into the material layer for the base 110, whereby the base 110 having a plurality of grooves 111 is formed. At this time, an end width of the mold may gradually become smaller to allow the inserted mold to be easily taken out of the material layer for the base 110. Therefore, a width D of the groove 111 may be provided to become smaller from top to bottom. Also, the mold might not be in contact with the lower protective portion 140 to allow the upper surface of the lower protective portion 140 not to be damaged by the inserted mold. Therefore, the grooves 111 are formed so as not to pass through the lower surface of the base 110.

Next, as shown in FIG. 13B, the light-transmittance conversion portion 120 is formed in the grooves 111 of the base 110. The light-transmittance conversion portion 120 may be formed by the process of depositing the light-transmittance conversion portion 120 inside and outside the grooves 111 of the base 110 and then removing the portion where the light-transmittance conversion portion 120 is deposited outside the grooves of the base 110 by using a stripper.

Next, as shown in FIG. 13C, the upper protective portion 130 is formed on the base 110 and the light-transmittance conversion portion 120. Although not shown in detail, the upper protective portion 130 may be attached to the base 110 and the light-transmittance conversion portion 120 by a transparent adhesive.

In case of the viewing angle controlling film 100 according to another embodiment of the present invention, which is manufactured by the process according to FIGS. 13A to 13C, the width W of the light-transmittance conversion portion 120 is not uniform and may be provided to become smaller from top to bottom.

Figure 14A:
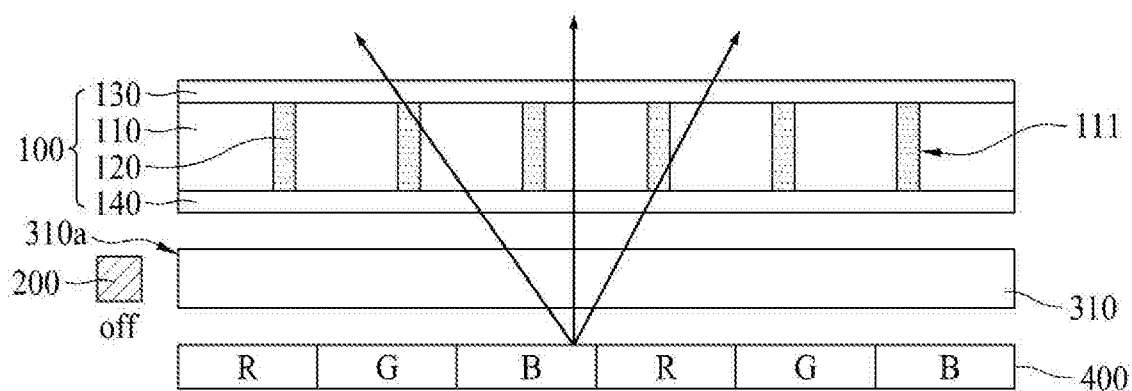
FIGS. 14A and 14B are brief views illustrating a display device comprising a viewing angle controlling device according to further still another embodiment of the present invention, wherein FIG. 14A corresponds to a wide viewing angle mode, and FIG. 14B corresponds to a narrow viewing angle mode.
Figure 14B:
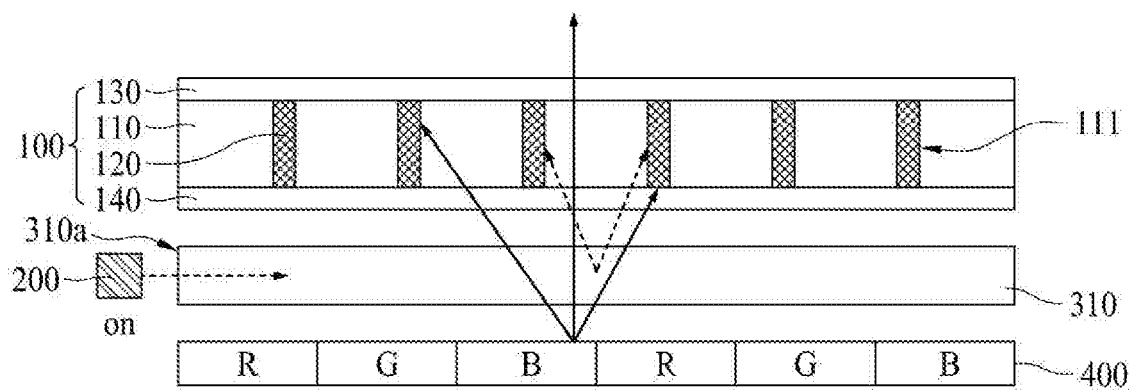

FIGS. 14A and 14B are brief views illustrating a display device comprising a viewing angle controlling device according to further still another embodiment of the present invention, which are a self-light emission display device like an organic light emitting display device, wherein FIG. 14A corresponds to a wide viewing angle mode, and FIG. 14B corresponds to a narrow viewing angle mode.

As shown in FIGS. 14A and 14B, the display device according to further still another embodiment of the present invention comprises viewing angle controlling devices 100 and 200, a light guide plate 310, and a display panel 400.

The viewing angle controlling devices 100 and 200 include the viewing angle controlling film 100 and the viewing angle controlling light source 200.

Various modifications may be made to the viewing angle controlling film 100 in the same manner as FIGS. 2A and 2B, FIGS. 3A and 3B, FIGS. 4A to 4C or FIGS. 5A and 5B, and their repeated description will be omitted.

The viewing angle controlling light source 200 may be arranged to face one side 310a of the light guide plate 310, and the light guide plate 310 may be arranged between the viewing angle controlling film 100 and the display panel 400. Therefore, since the light guide plate 310 may be formed to adjoin the viewing angle controlling film 100, light emitted from the viewing angle controlling light source 200 may be supplied to the viewing angle controlling film 100 through the light guide plate 310, whereby light efficiency may be improved.

Various modifications may be made to the structure of the viewing angle controlling light source 200 and the light guide plate 310 like the structure of the viewing angle controlling light source 200 and the light guide plate 310 except the backlight light source 300 in the aforementioned structure of FIGS. 7A, 8 and 9. That is, as described with reference to FIG. 6, the viewing angle controlling light source 200 may be arranged to face the other side 310c of the light guide plate 310. Also, as described with reference to FIG. 8, the viewing angle controlling light source 200 may be arranged to face the corner surface 310d of the light guide plate 310. In this case, a photo-reflective pattern 315 for transmitting light emitted from the display panel 400 and reflecting light emitted from the viewing angle controlling light source 200 may additionally be formed on the lower surface 310e of the light guide plate 310. Also, as described with reference to FIG. 9, the viewing angle controlling light source 200 may be arranged at the end of the other side 310c of the light guide plate 310, and an auxiliary light guide plate 250 may additionally be formed at the other side 310c of the light guide plate 310.

Meanwhile, as described with reference to FIG. 10, a convex type condensing pattern 280 may additionally be formed on the upper surface of the light guide plate 310.

The display panel 400 may be arranged between the light guide plate 310. The display panel 400 is made of, but not limited to, an organic light emitting display panel that includes pixels of red (R), green (G) and blue (B).

In further still another embodiment of the present invention, the light-transmittance conversion portion 120 provided in the viewing angle controlling film 100 is not reacted with light emitted from the display panel 400, and is reacted with light emitted from the viewing angle controlling light source 200, whereby light transmittance is reversibly changed.

A viewing angle controlling method of the display device according to further still another embodiment of the present invention is as follows.

As shown in FIG. 14A, if the viewing angle controlling light source 200 is maintained at an off-state, the light-transmittance conversion portion 120 becomes a transparent state, whereby the viewing angle controlling film 100 fully becomes transparent. Therefore, the light emitted from the display panel 400 moves toward various directions by transmitting the base 110 and the light-transmittance conversion portion 120, whereby a wide viewing angle mode is realized.

As shown in FIG. 14B, if the viewing angle controlling light source 200 is maintained at an on-state, light emitted from the viewing angle controlling light source 200 is supplied to the viewing angle controlling film 100 through the light guide plate 310 and thus the light-transmittance conversion portion 120 becomes an opaque state, whereby the viewing angle controlling film 100 includes a transparent area (an area of the base 110) and an opaque area (an area of the light-transmittance conversion portion 120). Therefore, the light emitted from the display panel 400 moves to the transparent area only, whereby a narrow viewing angle mode is realized.

According to the present invention as described above, the following advantages are obtained.

According to the present invention, as the viewing angle controlling film includes the light-transmittance conversion portion of which light transmittance is reversibly changed by being reacted with light of a predetermined wavelength range, a viewing angle of the display device may be controlled easily while the viewing angle controlling film is not detachable to a display panel.

It will be apparent to those skilled in the art that various modifications and variations can be made in the viewing angle controlling film, the backlight unit using the same, and the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A viewing angle controlling film, comprising:
a first area where light transmittance is not converted;
a second area where light transmittance is converted; and
a third area adjoining the first area laterally and overlapping the second area vertically, a material of the third area being different from each of a material of the second area and a material of the first area,
wherein the second area includes a first light-transmittance conversion portion configured to react with light of a predetermined wavelength range to convert the light transmittance and not to react with light of a wavelength range other than the predetermined wavelength range, and
wherein the third area includes an opaque area having a light-shielding portion.

2. The viewing angle controlling film of claim 1, wherein the first light-transmittance conversion portion includes a photo-reactive transmittance conversion material of which light-transmittance is reversibly converted by being reacted with light of the predetermined wavelength range without being reacted with the light of the wavelength range other than the predetermined wavelength range, and
the photo-reactive transmittance conversion material is contained in the first light-transmittance conversion portion in the range of 1 weight % to 20 weight %.

3. The viewing angle controlling film of claim 1, further comprising a protective portion for sealing the first light-transmittance conversion portion, wherein beads are included in the protective portion.

4. The viewing angle controlling film of claim 1, wherein the first area includes a transparent area, and adjoins the second area laterally.

5. A viewing angle controlling film, comprising:
a first area where light transmittance is not converted;
a second area where light transmittance is converted; and
a third area adjoining the first area laterally and overlapping the second area vertically, a material of the third area being different from each of a material of the second area and a material of the first area,
wherein the second area includes a first light-transmittance conversion portion configured to react with light of a predetermined wavelength range to convert the light transmittance and not to react with light of a wavelength range other than the predetermined wavelength range, and
wherein the third area includes a second light-transmittance conversion portion, and a wavelength range of light with which the first light-transmittance conversion portion is reacted is different from a wavelength range of light in which the second light-transmittance conversion portion is reacted.

6. A viewing angle controlling film, comprising:
a first area where light transmittance is not converted;
a second area where light transmittance is converted; and
a third area adjoining the first area laterally and overlapping the second area vertically, a material of the third area being different from each of a material of the second area and a material of the first area,
wherein the second area includes a first light-transmittance conversion portion configured to react with light of a predetermined wavelength range to convert the light transmittance and not to react with light of a wavelength range other than the predetermined wavelength range, and
wherein the third area includes a second light-transmittance conversion portion,
each of the first light-transmittance conversion portion and the second light-transmittance conversion portion includes a photo-reactive transmittance conversion material of which light-transmittance is reversibly converted by being reacted with light of the predetermined wavelength range without being reacted with the light of the wavelength range other than the predetermined wavelength range, and
a content of the photo-reactive transmittance conversion material contained in the first light-transmittance conversion portion is different from a content of the photo-reactive transmittance conversion material contained in the second light-transmittance conversion portion.

* * * * *